Sept. 22, 1942.    A. B. NEWTON    2,296,534
REFRIGERATION CONTROL SYSTEM
Filed Jan. 25, 1940
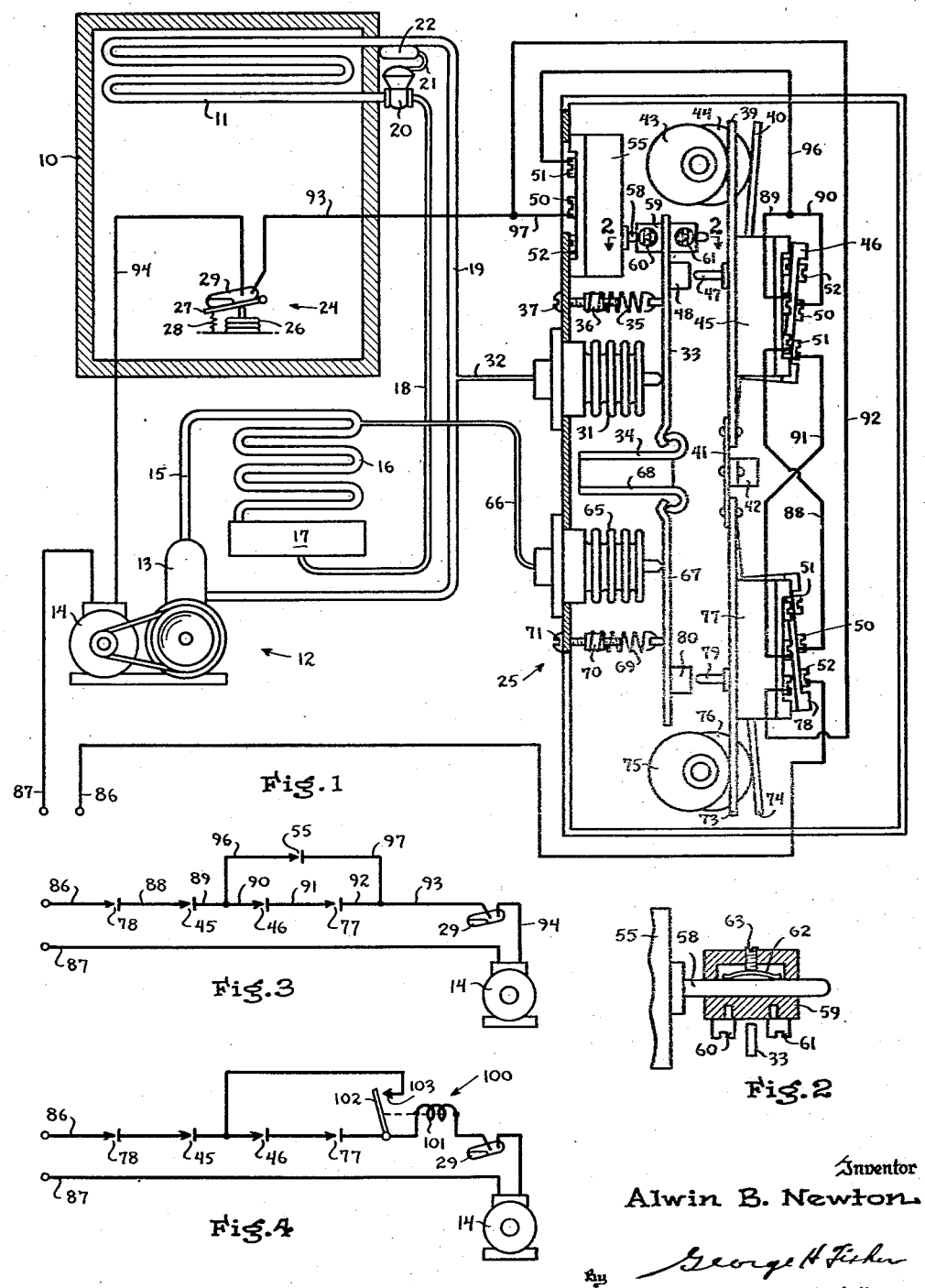
Inventor
Alwin B. Newton.
By George H Fisher
Attorney Patented Sept. 22, 1942

2,296,534

UNITED STATES PATENT OFFICE 2,296,534

REFRIGERATION CONTROL SYSTEM

Alwin B. Newton, Minneapolis, Minn., assignor to Minneapolis-Honeywell Regulator Company, Minneapolis, Minn., a corporation of Delaware Application January 25, 1940, Serial No. 315,564

11 Claims. (Cl. 62—4)

This invention relates to a control system for a refrigerating apparatus for accomplishing substantially the same results as are accomplished in application Serial No. 101,107 filed by Wayland R. Miller on September 16, 1936.

The Wayland R. Miller application utilizes a starter for controlling the load circuit to a compressor motor and this starter is controlled by control circuits, one of the control circuits being a starting circuit and another control circuit being a maintaining circuit including a maintainng switch which is operated by the starter. Such an arrangement operates satisfactorily but inasmuch as it needs a starter for the compressor motor it is necessarily relatively expensive to build.

It is therefore the prime object of the invention to provide a control arrangement of the type disclosed in the Wayland R. Miller application which does not require a starter for the compressor motor. According to the principles of this invention the starting circuit and the maintaining circuit act also as the load circuit for the compressor motor and a novel mechanism is utilized for operating the maintaining switch of the maintaining circuit. In one form of the invention the maintaining switch is operated by suction pressure in such a manner that the maintaining switch is closed when the suction pressure decreases and is opened when the suction pressure increases regardless of the actual value of the suction pressure. Thus the maintaining switch is closed whenever the compressor is operating and is opened whenever the compressor is not operating. In another form of the invention the maintaining switch is operated by a small electromagnet which is included in both the starting and maintaining load circuits, the arrangement being such that the maintaining switch is closed whenever the starting or maintaining load circuits are completed.

Other objects of this invention reside in the details of construction and the combination of elements utilized in obtaining the desired sequence of operation.

Further objects and advantages will become apparent to those skilled in the art upon reference to the accompanying specification, claims and drawing, in which:

Figure 1 is a diagrammatic illustration of one form of this invention;

Figure 2 is an enlarged detailed sectional view taken substantially along the line 2—2 of Figure 1;

Figure 3 is a schematic wiring diagram of the control arrangement of Figure 1; and Figure 4 is a schematic wiring diagram of another form of this invention.

Referring now to Figure 1 of the drawing, a compartment to be conditioned is designated at 10. A cooling coil in the form of an evaporator 11 is located in the compartment 10 for conditioning the medium therein. For purposes of illustration it is assumed that the compartment 10 is a storage compartment such as a walk-in box and that the evaporator 11 is utilized for maintaining a desired temperature condition therein. Refrigerant is circulated through the evaporator 11 by means of a refrigerating apparatus generally designated at 12. The refrigerating apparatus may comprise a compressor 13 operated by an electric motor 14. Compressed refrigerant is discharged from the compressor 13 through a high pressure line 15 into a condenser 16. Condensed refrigerant is collected in a receiver 17 and flows through a liquid line 18 into the evaporator 11. Evaporated refrigerant is withdrawn from the evaporator 11 through a suction line 19 by the compressor 13. The flow of refrigerant to the evaporator 11 is regulated by an expansion valve 20 which may be of the thermostatic type connected by a capillary tube 21 to a bulb 22 located at the outlet of the evaporator 11. The thermostatic expansion valve 20 operates to maintain a desired amount of liquid refrigerant within the evaporator 11 for cooling purposes.

The compressor motor 14 and hence the compressor 13 are controlled by a controller generally designated at 24 responsive to the condition of the medium being controlled by the evaporator 11, such as the temperature within the compartment 10, and also by a unitary control arrangement generally designated at 25 responsive to suction pressure and head pressure of the refrigerating apparatus.

The controller 24 responsive to the temperature within the compartment 10 may comprise a bellows 26 charged with a volatile fluid for operating a lever 27 against the action of an adjustable tension spring 28. The lever 27 in turn operates a mercury switch 29 and for purposes of illustration it is assumed that when the temperature within the compartment 10 rises to 42° the mercury switch 29 is closed and when the temperature decreases to 40° the mercury switch 29 is opened.

The unitary control arrangement 25 may comprise a bellows 31 connected by a pipe 32 to the suction line 19 so that the bellows 31 is expanded and contracted in accordance with the suction pressure of the refrigerating apparatus. The bellows 31 operates a lever 33 fulcrumed on a fulcrum member 34 against the action of an adjustable tension spring 35. One end of the tension spring 35 is connected to the lever 33 and the other end is connected to a nut 36 screw threadedly mounted on a screw 37. By rotating the screw 37 the tension in the spring 35 may be varied to adjust the pressure setting of this portion of the unitary control arrangement.

A pair of levers 39 and 40 are carried by leaf springs 41 secured to a bracket 42. The leaf springs 41 urge the levers 39 and 40 into engagement with concentrically located and independently adjusted cams 43 and 44. The levers 39 and 40 in turn carry snap action switches 45 and 46 which may be of the type shown and described in application Serial No. 307,991 filed by Albert E. Baak on December 7, 1939. The snap action switches 45 and 46 are self-return switches and are provided with plungers 47 which are adapted to be engaged by a pad 48 carried by the lever 33. The snap action switches 45 and 46 include a single pole double throw switch which is electrically connected to the terminals 50, 51 and 52. When the plunger 47 of one of the switches is moved inwardly a circuit is completed across terminals 50 and 51 and when the plunger 47 is released this circuit is broken and one is completed across terminals 50 and 52. Upon an increase in suction pressure the pad 48 engages the plungers 47 to move the plungers 47 inwardly to complete the circuit across terminals 50 and 51, i. e. to close the snap switches 45 and 46. By rotating the cams 43 and 44 the pressure values at which the snap action switches 45 and 46 operate may be varied. For purposes of illustration it is assumed that upon an increase in suction pressure the snap switch 45 is first closed at 20 lbs. and then the snap switch 46 is closed at 35 lbs. Upon a decrease in suction pressure the snap switch 46 is first opened at 30 lbs. and then the snap switch 45 is opened at 15 lbs.

Another snap switch is shown at 55 and this snap switch is similar to switches 45 and 46 with the exception that the switch 55 is a two position switch requiring positive operation in both directions to open and close the switch. See Figure 5 of the aforementioned Baak application. The plunger 58 thereof is frictionally engaged by a member 59 provided with eccentric screws 60 and 61 which are engaged by the end of the lever 33. By referring to Figure 2 of the drawing it is seen that a leaf spring 62 engages the plunger 58 for urging the plunger 58 into engagement with the member 59. The tension of the leaf spring 62 may be adjusted by a set screw 63. Upon an increase in suction pressure the lever 33 engages the eccentric screw 61 to pull the plunger 58 to cause the snap switch 55 to open, i. e. break the circuit across terminals 50 and 51. Upon a decrease in suction pressure the lever 33 engages the eccentric screw 60 to push the plunger 58 to close the snap switch 55, that is complete the circuit across terminals 50 and 51. Due to the slip friction connection between the member 59 and the plunger 58 the snap switch 55 is operated substantially immediately upon a reversal in the trend of the suction pressure. For example, assume that the compressor 13 is not operating and that the switch 55 is opened. As soon as the compressor is placed in operation the suction pressure immediately decreases and the lever 33 engages the eccentric screw 60 to close the snap switch 55. A further decrease in suction pressure causes slipping of the connection between the member 59 and the plunger 58, the snap switch 55 remaining closed. As soon as the compressor 13 is stopped the suction pressure increases to cause the lever 33 to engage the eccentric screw 61 and the snap switch 55 opens. A further increase in suction pressure causes slipping of the connection between the member 59 and the plunger 58, the switch remaining open until such time as the compressor is again placed in operation. For purposes of illustration it is assumed that a decrease of 3 lbs. suction pressure is required to close the snap switch 55 and a 3 lb. increase in suction pressure is required to open the snap switch 55. The differential in pressure required to open and close the snap switch 55 may be varied by adjusting the eccentric screws 60 and 61.

The unitary control arrangement 25 may also comprise a bellows 65 connected by a pipe 66 to the high pressure line 15 or the condenser 16 so that the bellows 65 is operated in accordance with changes in head pressure. The bellows 65 operates a lever 67 fulcrumed on a fulcrum member 68 against the action of an adjustable tension spring 69. One end of the tension spring 69 is connected to the lever 67 and the other end is connected to a nut 70 screw threadedly mounted on a screw 71. By rotating the screw 71 the tension in the spring 79 may be varied to adjust the pressure setting of this portion of the unitary control arrangement.

A pair of levers 73 and 74 are carried by the leaf springs 41 and the leaf springs 41 urge the levers 73 and 74 into engagement with concentrically located and independently adjustable cams 75 and 76. The levers 73 and 74 carry snap switches 77 and 78 which are similar in construction to the snap switches 45 and 46. The snap switches 77 and 78 are provided with plungers 79 which are adapted to be engaged by a pad 80 carried by the lever 67. Upon an increase in head pressure, the pad 80 engages the plungers 79 of the snap switches 77 and 78 to break the circuit across the terminals 50 and 52, i. e., open the snap switches 77 and 78. Upon a decrease in head pressure the pad 80 releases the plunger 79 to complete the circuits across the terminals 50 and 52 of the snap switches 77 and 78, i. e., close the snap switches 77 and 78. For purposes of illustration, it is assumed that upon an increase in head pressure the snap switch 77 is first opened at 140 pounds and then the snap switch 78 is opened at 190 pounds. Upon a decrease in head pressure the snap switch 78 is first closed at 185 lbs. and then the snap switch 77 is closed at 135 pounds.

Power is supplied to the compressor motor 14 and to the control system by means of line wires 86 and 87 leading from some source of power, not shown.

With the parts in the position shown in Figure 1, the compressor 13 is not operating and the mercury switch 29 of the temperature controller 24 is open. Assume now that the head pressure is below 135 pounds whereupon the snap switches 77 and 78 are closed and that the suction pressure rises to 35 pounds whereupon the snap switches 45 and 46 are closed. When the temperature within the compartment 10 rises to 42°, a starting load circuit is completed from the line wire 86 through snap switch 78, wire 88, snap switch 45, wires 89 and 90, snap switch 46, wire 91, snap switch 77, wires 92 and 93, mercury switch 29, wire 94, and compressor motor 14 back to the other line wire 87. Completion of this starting load circuit causes operation of the compressor motor 14 and hence operation of the compressor 13.

As soon as the compressor 13 is thus placed in operation, the suction pressure immediately decreases sufficiently to cause the snap switch 55 to close. Snap switch 55 closes before snap switch 46 opens. Closure of the snap switch 55 establishes a maintaining load circuit which is independent of the snap switches 46 and 77 for maintaining the compressor in operation even though the suction pressure decreases below 30 pounds or the head pressure increases above 140 pounds. This maintaining load circuit may be traced from the line wire 86 through snap switch 78, wire 88, snap switch 45, wires 89 and 96, snap switch 55, wires 97 and 93, mercury switch 29, wire 94, and compressor motor 14 back to the other line wire 87. Completion of this maintaining load circuit maintains the compressor in operation until either the temperature within the compartment 10 decreases to 40° or the suction pressure decreases to 15 pounds or the head pressure increases to 190 pounds.

When any of these contingencies occur the maintaining circuit is broken and the compressor motor 14 and hence the compressor 13 are stopped. Immediately upon stopping of the compressor 13 the suction pressure rises sufficiently to cause the snap switch 55 to open. It is therefore impossible to restart the compressor after it has once stopped until the above starting load circuit is again reestablished and this may occur only when the mercury switch 29 of the temperature responsive controller 24 closes, the suction pressure increases to 35 pounds to close the snap switch 46 and the head pressure decreases to 135 pounds to close the snap switch 77.

From the above, it is seen that I have provided a control arrangement wherein a compressor is started only when the temperature within the compartment rises to a predetermined high value, the suction pressure rises to a predetermined high value, which value may be a defrosting value, and the head pressure decreases to a predetermined low value. After the compressor has once been started it will remain in operation until either the temperature within the compartment decreases to a predetermined low value or the suction pressure decreases to a predetermined low value or the head pressure increases to a predetermined high value. In carrying out this invention, it is seen that separate control circuits and load circuits for the compressor are not needed and that the starter for the compressor is eliminated. A novel switching arrangement operated upon changes in suction pressure regardless of the actual value thereof is utilized for completing the maintaining load circuit. By reason of the arrangement of this invention, substantially the same results are obtained as are obtained in the above referred to Wayland R. Miller application in an improved and less expensive manner.

Figure 3 shows schematically the wiring arrangement utilized in Figure 1. Instead of utilizing the slip friction operated maintaining switch 55 of Figures 1 and 3 for completing the maintaining load circuit, a different maintaining switch may be utilized such as illustrated in Figure 4. Here an electromagnetic switch is illustrated at 100 and it comprises an operating coil 101 for moving a switch arm 102 into engagement with a contact 103 when the operating coil 101 is energized. When the operating coil 101 is de-energized, the switch arm 102 is moved out of engagement with the contact 103 by means of springs, gravity or other means, not shown. The switch arm 102 and the contact 103 form the maintaining switch which is in parallel with the snap switches 46 and 47 and the operating coil 101 is included in both the starting and maintaining load circuits. The operation of the arrangement of Figure 4 is therefore exactly the same as that of Figures 1 and 3 and therefore a further description thereof is not considered necessary.

Although for purposes of illustration one form of this invention has been disclosed, other forms thereof may become apparent to those skilled in the art upon reference to this disclosure and therefore this invention is to be limited only by the scope of the appended claims.

I claim as my invention:

1. In a refrigerating apparatus having an evaporator for controlling the condition of a medium, a compressor for circulating refrigerant through the evaporator and an electric motor for operating the compressor, in combination therewith, a first switch, means responsive to a condition of the medium being controlled indicative of a need for compressor operation for opening and closing the first switch, a second switch, means responsive to suction pressure for closing the second switch when the suction pressure increases to a predetermined high value, a third switch, means responsive to suction pressure for opening the third switch when the suction pressure decreases to a predetermined low value, a fourth switch, means operative as an incident to operation of the compressor for closing the fourth switch, a starting load circuit through the electric compressor motor including the first, second and third switches and the electric compressor motor in series, and a maintaining load circuit through the electric compressor motor including the first, third and fourth switches and the electric compressor motor in series.

2. In a refrigerating apparatus having an evaporator for controlling the condition of a medium, a compressor for circulating refrigerant through the evaporator and an electric motor for operating the compressor, in combination therewith, a first switch, means responsive to a condition of the medium being controlled indicative of the need for compressor operation for opening and closing the first switch, a second switch, means responsive to suction pressure for closing the second switch when the suction pressure increases to a predetermined high value, a third switch, means responsive to suction pressure for opening the third switch when the suction pressure decreases to a predetermined low value, a fourth switch, means responsive to head pressure for closing the fourth switch when the head pressure decreases to a predetermined low value, a fifth switch, means responsive to head pressure for opening the fifth switch when the head pressure increases to a predetermined high value, a sixth switch, means operative as an incident to operation of the compressor for closing the sixth switch, a starting load circuit through the electric compressor motor including the first, second and fourth switches and the electric compressor motor in series, a maintaining load circuit through the electric compressor motor including the first, third, fifth and sixth switches and the electric compressor motor in series.

3. In a refrigerating apparatus having an evaporator for controlling the condition of a medium, a compressor for circulating refrigerant through the evaporator and an electric motor for operating the compressor, in combination therewith, a first switch, means responsive to a condition of the medium being controlled indicative of the need for compressor operation for opening and closing the first switch, a second switch, means responsive to suction pressure for closing the second switch when the suction pressure increases to a predetermined high value, a third switch, a starting load circuit through the electric compressor motor including the first and second switches and the electric compressor motor in series, a maintaining load circuit through the electric compressor motor including the first and third switches in series and the electric compressor motor in series, an electromagnet in both the starting and maintaining load circuits for closing the third switch when either load circuit is completed.

4. In a refrigerating apparatus having an evaporator for controlling the condition of a medium, a compressor for circulating refrigerant through the evaporator and an electric motor for operating the compressor, in combination therewith, a first switch, means responsive to the condition of the medium being controlled indicative of the need for compressor operation for opening and closing the first switch, a second switch, means responsive to suction pressure for closing the second switch when the suction pressure increases to a predetermined high value, a third switch, means responsive to suction pressure for opening the third switch when the suction pressure decreases to a predetermined low value, a fourth switch, a starting load circuit through the electric compressor motor including the first, second and third switches and the electric compressor motor in series, and a maintaining load circuit through the electric compressor motor including the first, third and fourth switches and the electric compressor motor in series, an electromagnet in both the starting and maintaining load circuits for closing the fourth switch when either load circuit is completed.

5. In a refrigerating apparatus having an evaporator for controlling the condition of a medium, a compressor for circulating refrigerant through the evaporator and an electric motor for operating the compressor, in combination therewith, a first switch, means responsive to a condition of the medium being controlled indicative of the need for compressor operation for opening and closing the first switch, a second switch, means responsive to suction pressure for closing the second switch when the suction pressure increases to a predetermined high value, a third switch, means responsive to suction pressure for opening the third switch when the suction pressure decreases to a predetermined low value, a fourth switch, means responsive to head pressure for closing the fourth switch when the head pressure decreases to a predetermined low value, a fifth switch, means responsive to head pressure for opening the fifth switch when the head pressure increases to a predetermined high value, a sixth switch, a starting load circuit through the electric compressor motor including the first, second and fourth switches and the electric compressor motor in series, a maintaining load circuit through the electric compressor motor including the first, third, fifth and sixth switches and the electric compressor motor in series, an electromagnet in both the starting and maintaining load circuits for closing the sixth switch when either load circuit is completed.

6. In a refrigerating apparatus having an evaporator for controlling the condition of a medium, a compressor for circulating refrigerant through the evaporator and an electric motor for operating the compressor, in combination therewith, a first switch, means responsive to a condition of the medium being controlled indicative of the need for compressor operation for opening and closing the first switch, a second switch, means responsive to head pressure for closing the second switch when the head pressure decreases to a predetermined low value, a third switch, means responsive to head pressure for opening the second switch when the head pressure increases to a predetermined high value, a fourth switch, means operative as an incident to operation of the compressor for closing the fourth switch, a starting load circuit through the electric compressor motor including the first, second and third switches and the electric compressor motor in series, and a maintaining load circuit through the electric compressor motor including the first, third and fourth switches and the electric compressor motor in series.

7. In a refrigerating apparatus having an evaporator for controlling the condition of a medium, a compressor for circulating refrigerant through the evaporator and an electric motor for operating the compressor, in combination therewith, a first switch, means responsive to a condition of the medium being controlled indicative of the need for compressor operation for opening and closing the first switch, a second switch, means responsive to head pressure for closing the second switch when the head pressure decreases to a predetermined low value, a third switch, means responsive to head pressure for opening the second switch when the head pressure increases to a predetermined high value, a fourth switch, a starting load circuit through the electric compressor motor including the first, second and third switches and the electric compressor motor in series, and a maintaining load circuit through the electric compressor motor including the first, third and fourth switches and the electric compressor motor in series, an electromagnet in both the starting and maintaining load circuits for closing the fourth switch when either load circuit is completed.

8. In a refrigerating apparatus having an evaporator for controlling the condition of a medium and an electrically controlled compressor for circulating refrigerant through the evaporator, in combination therewith, first switch means, means responsive to a condition of the medium being controlled by the evaporator indicative of the need for compressor operation for opening and closing the first switch means, second switch means, means responsive to suction pressure for closing the second switch means only when the suction pressure increases to a predetermined high value, third switch means, means operative upon a decrease in suction pressure for closing the third switch means and for opening the third switch means upon an increase in suction pressure regardless of the actual value of the suction pressure, a starting circuit for the electrically controlled compressor including the first and second switch means in series, and a maintaining circuit for the electrically controlled compressor including the first and third switch means in series.

9. In a refrigerating apparatus having an evaporator for controlling the condition of a medium and an electrically controlled compressor for circulating refrigerant through the evaporator, in combination therewith, first switch means, means responsive to a condition of the medium being controlled by the evaporator indicative of the need for compressor operation for opening and closing the first switch means, second switch means, means responsive to suction pressure for closing the second switch means only when the suction pressure increases to a predetermined high value, third switch means, means responsive to suction pressure for opening the third switch means when the suction pressure decreases to a predetermined low value, fourth switch means, means operative upon a decrease in suction pressure for closing the fourth switch means and for opening the fourth switch means upon an increase in pressure regardless of the actual value of the suction pressure, a starting circuit for the electrically controlled compressor including the first and second switch means in series, and a maintaining circuit for the electrically controlled compressor including the first, third and fourth switch means in series.

10. In a refrigerating apparatus having an evaporator for controlling the condition of a medium and an electrically controlled compressor for circulating refrigerant through the evaporator, in combination therewith, first switch means, means responsive to a condition of the medium being controlled by the evaporator indicative of the need for compressor operation for opening and closing the first switch means, second switch means, means responsive to head pressure for closing the second switch means only when the head pressure decreases to a predetermined low value, third switch means, means responsive to head pressure for opening the third switch means when the head pressure increases to a predetermined high value, fourth switch means, means operative upon a decrease in suction pressure for closing the fourth switch means and for opening the fourth switch means upon an increase in pressure regardless of the actual value of the suction pressure, a starting circuit for the electrically controlled compressor including the first and second switch means in series, and a maintaining circuit for the electrically controlled compressor including the first, third and fourth switch means in series.

11. In a refrigerating apparatus having an evaporator for controlling the condition of a medium and an electrically controlled compressor for circulating refrigerant through the evaporator, in combination therewith, first switch means, means responsive to a condition of the medium being controlled by the evaporator indicative of the need for compressor operation for opening and closing the first switch means, second switch means, means responsive to suction pressure for closing the second switch means only when the suction pressure increases to a predetermined high value, third switch means, means responsive to suction pressure for opening the third switch means when the suction pressure decreases to a predetermined low value, fourth switch means, means responsive to head pressure for closing the fourth switch means only when the head pressure decreases to a predetermined low value, fifth switch means, means responsive to head pressure for opening the fifth switch means when the head pressure increases to a predetermined high value, sixth switch means, means operative upon a decrease in suction pressure for closing the sixth switch means and for opening the sixth switch means upon an increase in pressure regardless of the actual value of the suction pressure, a starting circuit for the electrically controlled compressor including the first, second and fourth switch means in series, and a maintaining circuit for the electrically controlled compressor including the first, third, fifth and sixth switch means in series.

ALWIN B. NEWTON.